(12) United States Patent
Nickerson et al.

(10) Patent No.: US 11,887,183 B2
(45) Date of Patent: *Jan. 30, 2024

(54) SYSTEMS AND METHODS OF SHARING AN AUGMENTED ENVIRONMENT WITH A COMPANION

(71) Applicant: Capital One Services, LLC, McLean, VA (US)

(72) Inventors: Karen Nickerson, Chicago, IL (US); Justin Wishne, Chicago, IL (US); Drew Jacobs, Arlington, VA (US); Justin Smith, Chicago, IL (US); Marco S. Giampaolo, Berwyn, IL (US); Hannes Jouhikainen, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/380,198

(22) Filed: Jul. 20, 2021

(65) Prior Publication Data
US 2021/0350452 A1 Nov. 11, 2021

Related U.S. Application Data

(63) Continuation of application No. 16/445,333, filed on Jun. 19, 2019, now Pat. No. 11,074,647, which is a
(Continued)

(51) Int. Cl.
*G06Q 30/06* (2023.01)
*G06T 19/00* (2011.01)
*G06Q 30/0601* (2023.01)
*G06F 3/14* (2006.01)
*G06T 11/00* (2006.01)
(Continued)

(52) U.S. Cl.
CPC ........ *G06Q 30/0643* (2013.01); *G06F 3/147* (2013.01); *G06F 3/1454* (2013.01);
(Continued)

(58) Field of Classification Search
None
See application file for complete search history.

(56) References Cited

U.S. PATENT DOCUMENTS

| 9,245,288 | B1 | 1/2016 | Lee et al. |
| 9,449,343 | B2 * | 9/2016 | Mayerle ............. G06Q 30/0268 |

(Continued)

OTHER PUBLICATIONS

Anon., "BioMedReports: In a World's First, DIRTT Demonstrates Power of Mixed Reality for Construction," Weblog post, Newstex Trade and Industry Blogs, Newstex, Jun. 16, 2016. (Year: 2016).*
(Continued)

*Primary Examiner* — Nicholas D Rosen
(74) *Attorney, Agent, or Firm* — TROUTMAN PEPPER HAMILTON SANDERS LLP; Christopher J. Forstner; John A. Morrissett

(57) ABSTRACT

A system includes one or more memory devices storing instructions, and one or more processors configured to execute the instructions to perform steps of a method for providing an interactive virtual environment. The system may receive environmental data, and augment the environmental data by adding virtual environmental data. The system may then provide this virtual environment to two or more devices. The system can then receive user input, and modify the virtual environment in response to those inputs.

20 Claims, 7 Drawing Sheets

Related U.S. Application Data continuation of application No. 16/180,780, filed on Nov. 5, 2018, now Pat. No. 10,380,677, which is a continuation of application No. 15/664,705, filed on Jul. 31, 2017, now Pat. No. 10,121,190.

(60) Provisional application No. 62/437,697, filed on Dec. 22, 2016.

(51) Int. Cl.
| | | |
|---|---|---|
| *G06F 3/147* | (2006.01) | |
| *G06F 3/16* | (2006.01) | |
| *G06F 3/04842* | (2022.01) | |
| *G06F 3/04845* | (2022.01) | |

(52) U.S. Cl.
CPC ......... *G06F 3/167* (2013.01); *G06Q 30/0601* (2013.01); *G06T 11/00* (2013.01); *G06F 3/04842* (2013.01); *G06F 3/04845* (2013.01); *G06F 3/16* (2013.01); *G06T 19/006* (2013.01); *G09G 2370/02* (2013.01)

(56) References Cited

U.S. PATENT DOCUMENTS

| | | | |
|---|---|---|---|
| 9,953,359 B2 | 4/2018 | Argue | |
| 10,121,190 B2* | 11/2018 | Nickerson | G06T 11/00 |
| 10,275,825 B2* | 4/2019 | Zises | G06Q 30/0643 |
| 10,304,103 B2* | 5/2019 | Thomas | G06Q 30/0613 |
| 10,380,677 B2* | 8/2019 | Nickerson | G06Q 30/0643 |
| 11,074,647 B2* | 7/2021 | Nickerson | G06Q 30/0601 |
| 2013/0215116 A1 | 8/2013 | Siddique | |
| 2014/0100997 A1 | 4/2014 | Mayerle | |
| 2014/0156459 A1* | 6/2014 | Zises | G06Q 30/0643 705/26.61 |
| 2014/0214595 A1* | 7/2014 | Argue | G06Q 30/0633 705/26.8 |
| 2015/0302650 A1* | 10/2015 | Abdelmoati | G06F 3/041 345/633 |
| 2016/0275401 A1* | 9/2016 | Cao | G06N 20/10 |
| 2017/0243270 A1 | 8/2017 | Thomas | |

OTHER PUBLICATIONS

De Troyer et al., "Developing Semantic VR-Shops for e-Commerce," Virtual Reality, 11(2-3), 89-106, doi: http://dx.doi.org/10.1007/s10055-006-0057-y (Year: 2007).

Heather Somerville, Virtual Technology Quickly Becoming a Reality, The Virginian Pilot, (Jan. 12, 2014), https://dialog.proquest.com/professional/docview/1477182251?accountid=142257.

Analysis: In-store technology to attract consumer interaction. (2013). Retail Week, n/a. Retrieved from https://dialog.proquest.com/professional/docreview/1324132954?accountid=131444.

* cited by examiner

SYSTEMS AND METHODS OF SHARING AN AUGMENTED ENVIRONMENT WITH A COMPANION

CROSS-REFERENCE TO RELATED APPLICATION

This application is a continuation of, and claims priority under 35 U.S.C. § 120 to, U.S. patent application Ser. No. 16/445,333, filed Jun. 19, 2019, which is a continuation of U.S. patent application Ser. No. 16/180,780, filed Nov. 5, 2018, now U.S. Pat. No. 10,380,677, which is a continuation of U.S. patent application Ser. No. 15/664,705, filed Jul. 31, 2017, now U.S. Pat. No. 10,121,190, which claims the benefit of U.S. Provisional Application No. 62/437,697, filed Dec. 22, 2016, the entire contents and substance of which are hereby incorporated by reference as if fully set forth below.

FIELD OF INVENTION

The present disclosure relates to systems and methods for providing two or more users with an augmented environment, and more particularly an interactive virtually augmented environment.

BACKGROUND

Certain experiences are better when shared with one or more other people, but having someone else physically present is not always possible. For example, a shopper may wish to have a companion help select product such as clothing, home goods, or groceries. In the event that another person is unable to physically be present, video chat applications are currently available to provide two-way audiovisual communication using one or more cameras and/or microphones. These applications can allow a person not physically present to see and hear some of the experience.

However, these applications cannot provide the users with a truly shared environment, and the remote individual often lacks the ability to clearly indicate or act upon items in the experience. For example, if a user is shopping for clothes, the remote individual has no ability to move, change, or directly indicate anything in the shopper's vision. The remote individual has no way of, for example, handing the shopper an item of clothing to try on, or even indicating a particular item on a shelf or display. While the current applications allow some limited interaction, they do not provide a truly shared and interactive environment.

Accordingly, there is a need for systems and methods that allow a device to collect information about an experience, augment that information with interactive virtual elements, and share that augmented environment between two or more people. Embodiments of the present disclosure are directed to this and other considerations.

SUMMARY

Disclosed embodiments provide systems and methods for sharing an augmented environment with a companion.

Consistent with the disclosed embodiments, the system may include one or more memory devices storing instructions, and one or more processors configured to execute the instructions to perform steps of a method to provide an interactive virtual environment. The system may execute the instructions to receive environmental data comprising audio and visual information representing a physical environment from a first computing device. The system may then augment the environmental data by adding virtual environmental data comprising data associated with a merchant. The one or more processors may then provide, to the first computing device, the virtual environmental data to create an augmented environment in combination with the physical environment. The system may then provide the environmental data and the virtual environmental data to create a virtual environment to a second computing device. The system may then receive user input data associated with one or more predefined user inputs from the second computing device. In response to the user input data, the system can then modify the virtual environment on the second computing device and the augmented environment on the first computing device to display modified virtual environmental data based on the user input data.

Consistent with the disclosed embodiments, methods for providing an interactive virtual environment are also disclosed.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
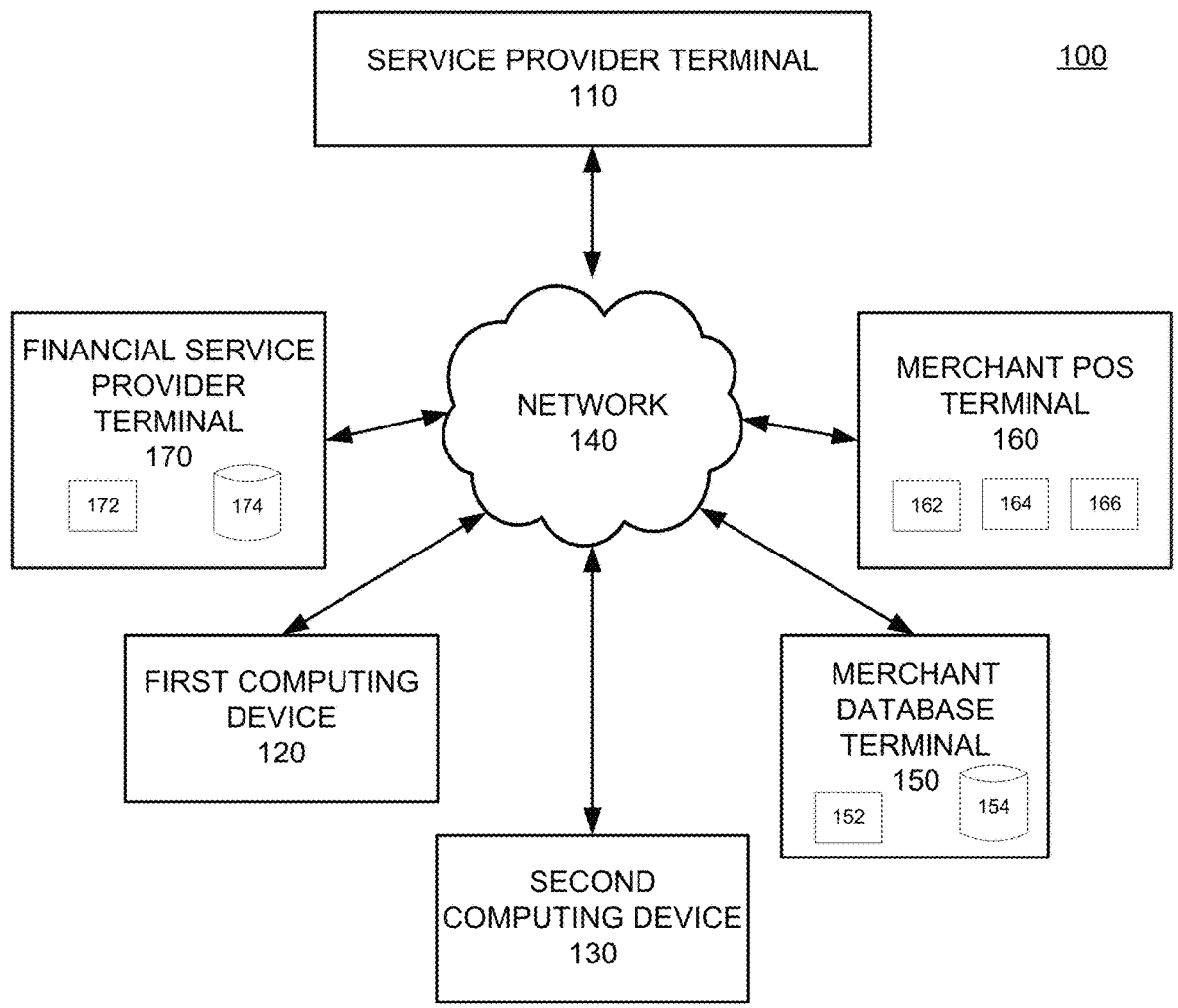
FIG. 1 is a diagram of an exemplary system that may be used to generate and share a virtual environment.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for sharing an interactive augmented environment with a companion. The system may include one or more memory devices storing instructions, and one or more processors configured to execute the instructions to perform steps of a method. Specifically, in some embodiments, the system may provide an interactive virtual environment. To accomplish this, the system may execute the instructions to receive environmental data comprising audio and visual information representing a physical environment from a first computing device. The system may then augment the environmental data by adding virtual environmental data comprising data associated with a merchant. The one or more processors may then provide, to the first computing device, the virtual environmental data to create an augmented environment in combination with the physical environment. The system may then create a virtual environment by providing the environmental data and the virtual environmental data to a second computing device. The system may then receive user input data associated with one or more predefined user inputs from the second computing device. In response to the user input data, the system can then modify the virtual environment on the second computing device and the augmented environment on the first computing device to display modified virtual environmental data based on the user input data.

In another embodiment, a system for providing an interactive augmented environment that may be used to create a shared experience between users of two computing devices may include an environmental data sensor for obtaining environmental data comprising audio and/or visual information representing a physical environment. The system may include an input/output device for transmitting environmental data to a first computing device, receiving virtual environmental data comprising data associated with a merchant from the first computing device, and receiving an user input data associated with one or more predefined user inputs from the first computing device. The system may further include an augmented environment processor that, based on environmental data obtained from the environmental data sensor and virtual environmental data received from the first computing device, generates a signal comprising augmented environmental data, and modifies the signal comprising augmented environmental data to integrate enhanced content based on user input data received from the first computing device. The enhanced content may represent content that is unrepresented in the physical environment. The system may include an augmented environmental data display that receives the signal comprising augmented environmental data and displays said augmented environmental data in accordance with said signal.

In another aspect, a non-transitory computer-readable medium storing instructions is disclosed. The instructions, when executed by one or more processors, may cause a computing device to perform steps of a method for providing an interactive virtual environment. Specifically, the computing device may receive environmental data comprising audio and visual information representing a physical environment from a first computing device. The computing device may then determine whether any of the purchased products on the listing correspond to one or more predetermined complementary product sets. This determination may result in the identification of one or more unpurchased products from the one or more complementary product sets. The instructions may then cause the computing device to augment the environmental data by adding virtual environmental data comprising data associated with a merchant.

In yet another respect, a method for providing an interactive virtual environment is disclosed. The method may include providing one or more memory devices storing instructions, and one or more processors configured to execute those instructions. The instructions may cause the system to provide, to the first computing device, the virtual environmental data to create an augmented environment in combination with the physical environment, and provide the environmental data and the virtual environmental data to create a virtual environment to a second computing device. After providing the virtual environmental data, the system may receive user input data associated with one or more predefined user inputs from the second computing device. The system may then modify the virtual environment on the second computing device and the augmented environment on the first computing device to display modified virtual environmental data based on the user input data.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can generate interactive virtual elements to augment an environment. The components and arrangements shown in FIG. 1 are not intended to limit the disclosed invention as the components used to implement the disclosed processes and features may vary.

In accordance with disclosed embodiments, an interactive virtual/augmented environment system 100 may include a service provider terminal 110 in communication with a first computing device 120 and a second computing device 130 via network 140. First and second computing devices 120 and 130 may include a mobile computing device (e.g., a smart phone, tablet computer, smart wearable device, portable laptop computer, voice command device, or other mobile computing device) or a stationary computing device (e.g., a stationary desktop or other stationary computer). Computing devices 120 and 130 may belong to or be provided by a consumer, or may be borrowed, rented, or shared. In some embodiments, computing devices 120 and 130 may be configured to provide one or more of an augmented reality and a virtual reality experience to one or more users, and may be equipped with a display, speakers or other auditory devices, tactile simulators, haptic sensors, cameras, light projectors, input devices, distance measuring equipment, 3D scanners, IR sensors, microphones, orientation/position/location sensors, accelerometers, and other devices configured to engage the user's senses to enhance the augmented/virtual reality experience.

In some embodiments, interactive virtual/augmented environment system 100 may also include a merchant database terminal 150 that communicates with other devices of system 100 via network 140. Optionally, in some embodiments, interactive virtual/augmented environment system 100 may also include a merchant point of sale (POS) terminal 160 that communicates with other devices of system 100 via network 140. Additionally, in some embodiments, interactive virtual/augmented environment system 100 may also include a financial service provider terminal 170 that communicates with other devices of system 100 via network 140.

Network 140 may be of any suitable type, including individual connections via the internet such as cellular or WiFi networks. In some embodiments, network 140 may connect terminals using direct connections such as radio-frequency identification (RFID), near-field communication (NFC), Bluetooth™, low-energy Bluetooth™ (BLE), WiFi™, ZigBee™, Z-Wave™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
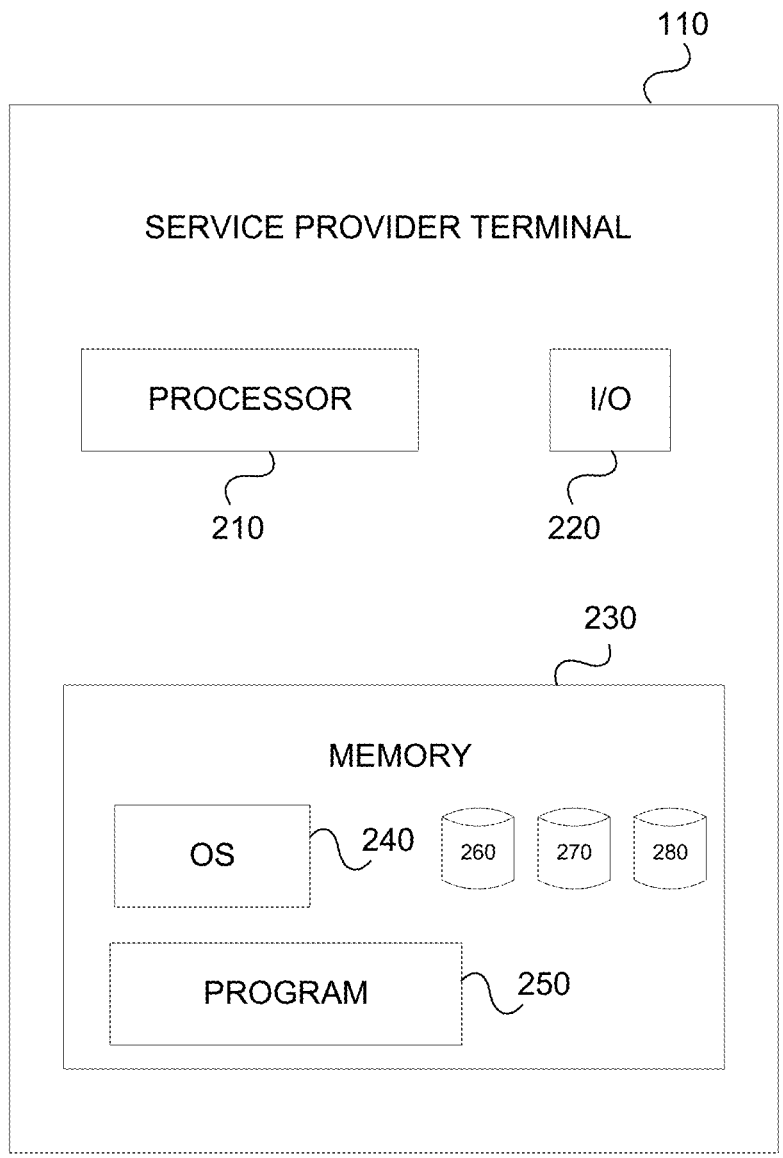
FIG. 2 is a component diagram of an exemplary service provider terminal.

An exemplary embodiment of service provider terminal 110 is shown in more detail in FIG. 2. Computing devices 120 and 130, merchant database terminal 150, merchant POS terminal 160, and financial service provider terminal 170 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with, for example, one or more of: radio-frequency identification (RFID), near-field communication (NFC), Bluetooth™, low-energy Bluetooth™ (BLE), WiFi™, ZigBee™ Z-Wave™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a merchant information database 260, an environment database 270, and a virtual environmental database 280 for storing related data to enable service provider terminal 110 to perform one or more of the processes and functionalities associated with the disclosed embodiments. Merchant information database 260 may include stored data relating to product price, product inventory, related products, and available discounts associated with one or more products associated with one or more merchants. Environment database 270 may include stored data relating to a physical environment that is captured by one or more devices (e.g., first computing device 120) of system 100. Virtual environment database 280 may include stored data relating to a virtual environment that is provided to and can be updated based upon interactions with one or more devices (e.g., computing devices 120 and 130) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL databases, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via user terminal 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 150 may have one or more processors 152 and one or more merchant databases 154, which may be any suitable repository of merchant data. Merchant database terminal 150 may be located at the POS location, off-site at another merchant location, or at a third party location. Information stored in merchant database 154 may be accessed (e.g., retrieved, updated, and added to) via network 140 by one or more devices (e.g., service provider terminal 110) of system 100. Merchant database 154 may store information relating to products and services offered by merchants such as pricing, quantity, availability, discounts, reviews, and any other such generally available information that a consumer may utilize in making a purchasing decision. In some embodiments, merchant database 154 may also include location information associated with products and services that identifies the location(s) that a particular product or service is available for purchase. In some embodiments, the location information may include an identification of a particular store, terminal, or kiosk that the product or service may be purchased from.

Merchant POS terminal 160 may have one or more POS devices 162, 164, 166 that communicate with one or more devices (e.g., computing devices 120 and 130) of system 100 via network 140. In some embodiments, POS devices 162, 164, 166 may be associated with one or more products or items at a POS location, and may serve as beacons to identify the associated products or items and related information to one or more devices of system 100.

Financial service provider terminal 170 may have one or more processors 172 and one or more financial service provider databases 174, which may be any suitable repository of merchant data. Financial service provider terminal 170 may be located at the POS location, off-site at another financial service provider location, or at a third party location. Information stored in financial service provider database 174 may be requested and sent to one or more devices (e.g., service provider terminal 110, merchant POS terminal 160) of system 100 via network 140.

Figure 7:
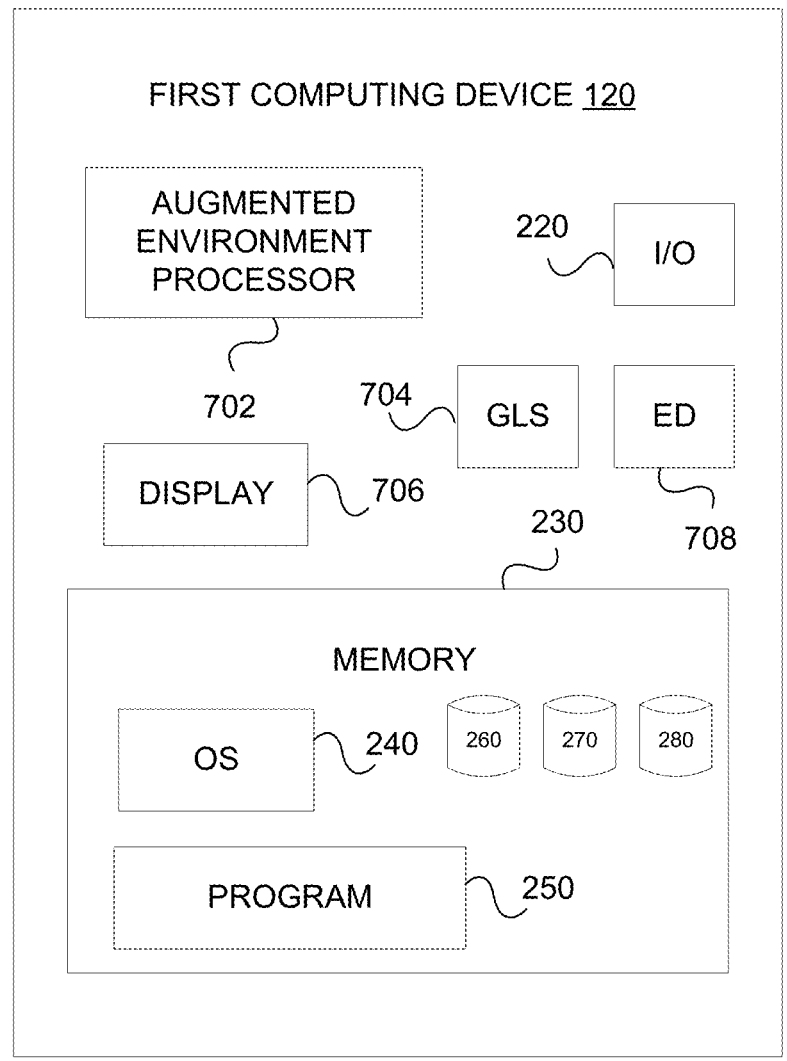
FIG. 7 is a component diagram of an exemplary computing device.

FIG. 7 shows an exemplary embodiment of first computing device 120. As shown, first computing device 120 may include input/output ("I/O") device 220 for transmitting and receiving data to and from another computing device (such as service provider terminal 110), memory 230 containing operating system ("OS") 240 and program 250 and all associated components as described above with respect to service provider terminal 110. First computing device 120 may also have one or more processors, including an augmented environment processor 702 for generating signals representative of augmented and/or virtual environments, a geographic location sensor ("GLS") 704 for determining the geographic location of first computing device 120 and/or an associated environmental data sensor 708, an augmented environmental display 706 for displaying augmented environmental data, and an environmental data ("ED") sensor 708 for obtaining environmental data including audio and/or visual information representing a physical environment. In some embodiments, environmental data sensor 708 may include a microphone or a digital camera. According to some embodiments, augmented environment processor 702 may include all of the features and functions of processor 210 described above. Further, augmented environment processor 702 may be configured to generate a signal comprising augmented environmental data based on environmental data obtained from the environmental data sensor 708. The augmented environment processor 702 may also be configured to modify the signal comprising augmented environmental data to integrate enhanced content based on user input received from a computing device (such as service provider terminal 110). The enhanced content may be content that is unrepresented in the physical environment. In some embodiments, the augmented environment processor 702 may identify one or more products in the visual information obtained by the environmental data sensor 708 and may associate merchant data from a merchant database 154 with one or more identified products.

In some embodiments, an augmented environment data signal may be used to create an augmented reality display of the physical environment including enhanced content. Further, another device (e.g., second computing device 130) may utilize the environmental data and virtual environmental data to create a virtual reality display of the physical environment including enhanced content. Accordingly, system 100 may enable the simultaneously display of an augmented reality display on a first computing device 120 and a virtual reality display of the same physical location on a second computing device 130, so that the users of the two devices may have a shared experience. In some embodiments, merchant data associated with the physical environment may be incorporated into either of the augmented reality display or the virtual reality display. Although FIG. 7 is described with respect to a first computing device 120, it is contemplated that in some embodiments, second computing device 130 may include some or all of the elements disclosed with respect to FIG. 7.

Figure 3:
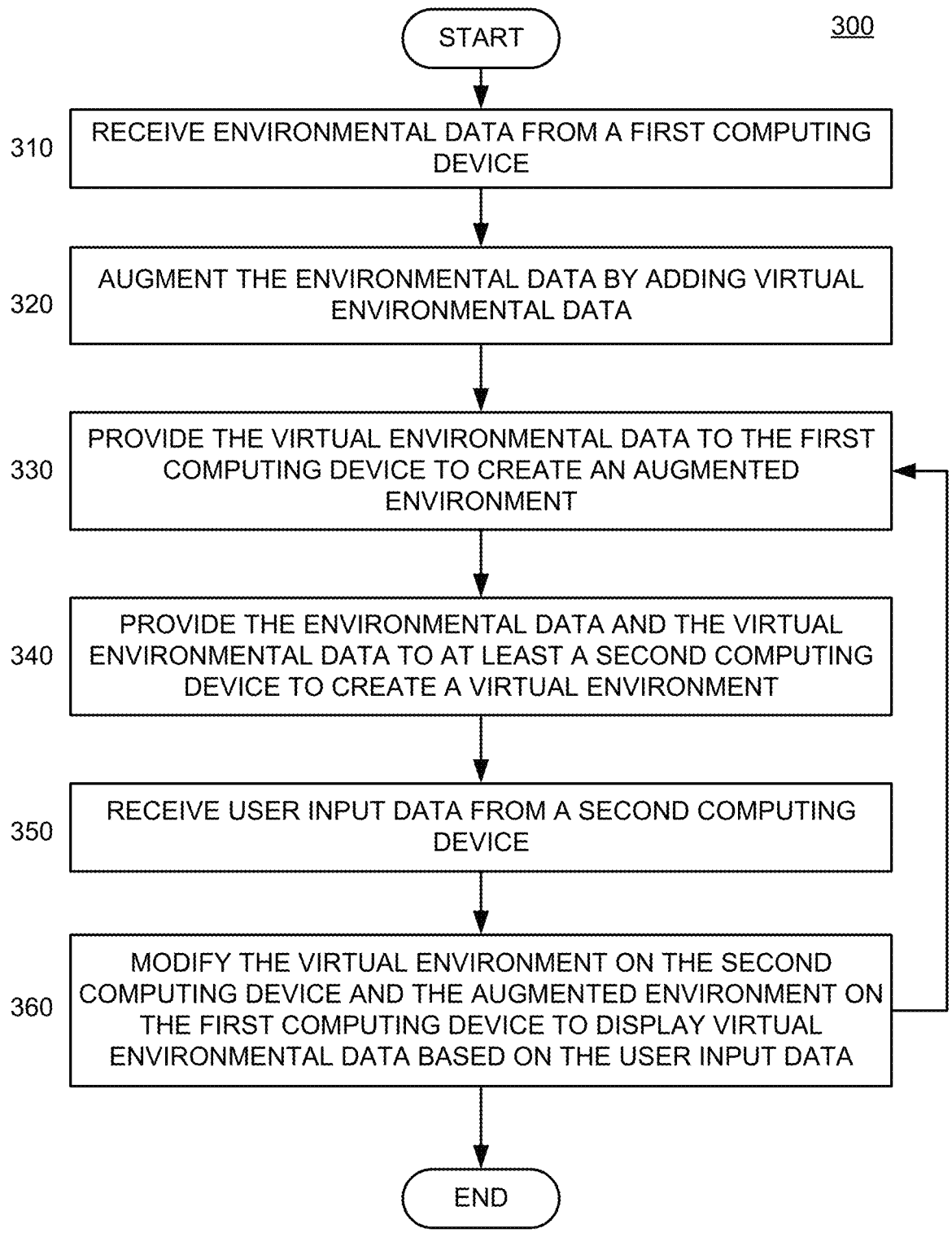
FIG. 3 is a flowchart of an exemplary method for generating and sharing a virtual environment.

FIG. 3 shows a flowchart of method 300 for generating and sharing an augmented environment. Method 300 may be performed by service provider terminal 110 using processor 210 to execute memory 230. In some embodiments, steps of method 300 may be delegated to other elements in system 100, such as the computing devices 120 and 130 and/or merchant database terminal 150. Following method 300, the users may generate, share, and modify virtually augmented environments.

In block 310, service provider terminal 110 may receive environmental data comprising audio and visual information via first computing device 120. At step 320, service provider terminal 110 may augment the environmental data by adding virtual environmental data. For example, this augmentation may involve identifying one or more products in the visual information and displaying information from the merchant that is specific to one of the one or more of the identified products. Products or other items can be identified by recognizing shapes, bar codes, QR codes, IR beacons or Bluetooth™ beacons located in an environment, or the like. Products may be identified by matching the visual information to a merchant-specific or non-merchant specific product database. Additionally, the system may pull in data from a synced user profile or user device to populate the augmented environment. Once those items are identified, service provider terminal 110 can connect to an appropriate merchant database terminal 150 to provide information relevant to the identified product or item.

In block 330, service provider terminal 110 may provide the virtual environmental data to first computing device 120 in order to create an augmented environment when viewed in combination with the physical environment. In some embodiments, the virtual environment data may include some or all of the environmental data provided by first computing device 120. In some embodiments, first computing device 120 may only receive the newly generated data. The virtual environmental data may include product price information, product inventory information, product manufacturing information, product marketing information or description, product ratings or reviews, social information (e.g. if friend has bought/pinned/added to a wishlist), related products, available discounts, and aesthetic visual effects (e.g., target graphics, glow, highlighted colors, or firework graphics displayed around one or more products). For example, service provider terminal may recognize a particular item or product and augment the environment with visual effects such as a price tag, other available brands or sizes, or aesthetic effects such as virtual fireworks or sale signs. Since second computing device 130 is not present to collect the environmental data, at step 340 that data may be provided along with the virtual environmental data to allow second computing device 130 to display or provide the augmented environment to a user.

After displaying the augmented environment to a user, second computing device 130 may receive user input in response to that augmented environment (block 350). For example, the user of second computing device 130 may touch a screen, make a gesture in the visual field of a video capturing component of second computing device 130, speak a command into an audio capturing component of second computing device 130, enter an input using a connected input device, or some combination of these. In some embodiments, second computing device 130 may be a virtual reality device including a headset and a camera. In such embodiments, the user may be viewing the augmented environment, and may physically reach for an element in that environment to generate user input data. User input data may also be generated by the user's interaction with keyboards, mouse devices, touch screens, track pads, trackballs, scroll wheels, digital cameras, microphones, sensors, and the like. In some embodiments, second computing device 130 can be a personal computer, with the augmented environment displayed on a monitor. A user may then select (e.g., using the mouse or other controller, or via motion if a motion sensor or device with an accelerometer is used in cooperation with the computer) a virtual element in the augmented environment to generate user input data.

After receiving the user input data, at block 360 service provider terminal 110 may modify the virtual environment in response to this input, and provide the modified augmented environment to first computing device 120, and optionally also to second computing device 130. An example of this modification may include moving a virtual element, changing a virtual element, adding or subtracting a virtual element, or any similar modification. The user of first computing device 120 can then perceive the virtual element changing or moving in the real world environment, via the augmented environment. In this way, the two users can not only share audio and visual information as in a video chat application, but can also manipulate virtual elements such as product price tags, aesthetic visual effects, or move items to a virtual shopping cart or return rack.

Optionally, in some embodiments, service provider terminal 110 may receive user input via one or more of computing devices 120 and 130 indicating a desire to purchase one or more identified products. In response, service provider terminal 110 transmit a purchase authorization request to financial service provider terminal 170, which may already have user account information associated with first and/or second computing devices 120 and 130. Once the request has been authorized, service provider terminal 100 may transmit a purchase request to merchant POS terminal 160 to purchase the identified products. Alternatively, in other embodiments, service provider terminal 100 may add the identified products to a checkout cart associated with first and/or second computing devices 120 and 130 for purchase at another time.

Figure 4:
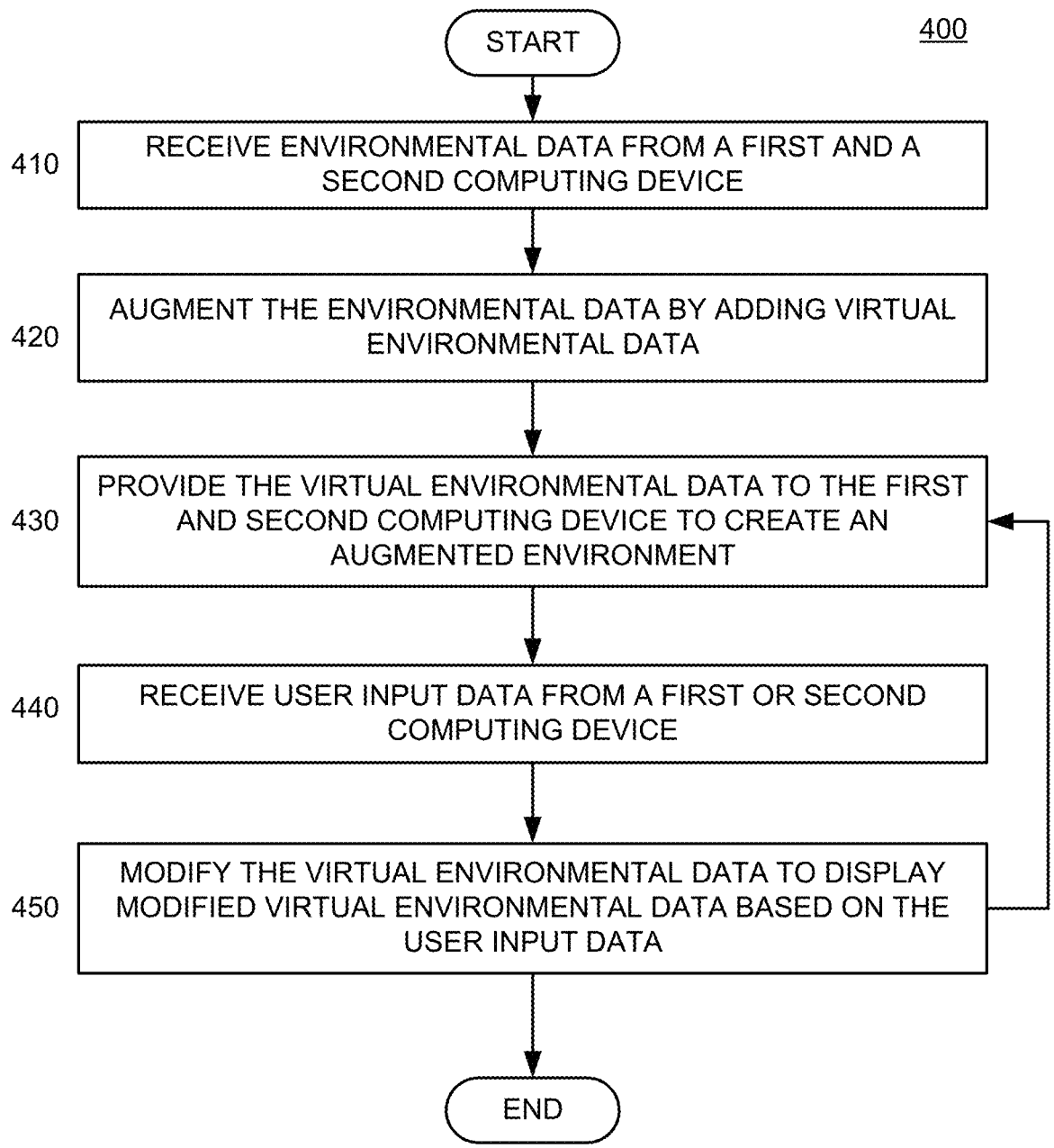
FIG. 4 is a flowchart of an exemplary method for generating and sharing a virtual environment.

FIG. 4 shows a flowchart of method 400 for generating and sharing an augmented environment wherein both the first and second computing devices 120 and 130 can receive environmental data directly. Method 400 may be performed by service provider terminal 110 using processor 210 to execute memory 230. In some embodiments, steps of method 400 may be delegated to other elements in system 100, such as the computing devices 120 and 130 and/or merchant database terminal 150. Following method 400, the users may generate, share, and modify virtually augmented environments.

In block 410, service provider terminal 110 may receive environmental data comprising audio and visual information via the first computing device 120 as well as the second computing device 130. At step 420, service provider terminal 110 may augment the environmental data by adding virtual environmental data in a manner similar to that discussed above with respect to step 320.

In block 430, service provider terminal 110 may provide the virtual environmental data to the first and second computing devices 120 and 130 in order to create an augmented environment when viewed in combination with the physical environment. Since the first and second computing devices 120 and 130 may not be collecting the exact same environmental data, at step 430 the virtual environmental data may be overlaid such that virtual elements are related to locations in space to provide the augmented environment to a user. For example, the first and second computing devices may be in the same store, but in different aisles. In such a situation, the augmented environments created by each device may include different virtual elements at any given time, however both devices can generate the same augmented environments when in the same location. When both devices are viewing the same shelf in the same aisle, they can each include a virtual element displaying merchant information. Modifications to the augmented environment may not be immediately viewed by both devices, but those modifications can be present at a particular location in the physical environment.

After displaying the augmented environment to the users, first and second computing devices 120 and 130 may receive user inputs in response to the augmented environment (block 440). For example, the user of the first or second computing devices 120 or 130 may touch a screen, make a gesture in the visual field of a video capturing component of the computing device, speak a command into an audio capturing component of the computing device, enter an input using a connected input device, or some combination of these. After receiving the user input data at block 440, at block 450, service provider terminal 110 may modify the virtual environmental data in response to this input, and provide the modified environmental data to the first and second computing devices 120 and 130. In some embodiments these modifications may include moving a virtual element, changing a virtual element, adding or subtracting a virtual element, or any similar modification.

For example, service provider terminal 110 may receive user input data from first computing device 120 requesting a virtual marker be placed next to a particular item on a store shelf. Once that shelf location becomes present in the environmental data of second computing device 130, the virtual marker will be present in response to the modification to the virtual environmental data in response to the user input data from first computing device 120. In this way, modifications made to the virtual environment by either computing device may be present in the augmented environment present on both devices.

Figure 5:
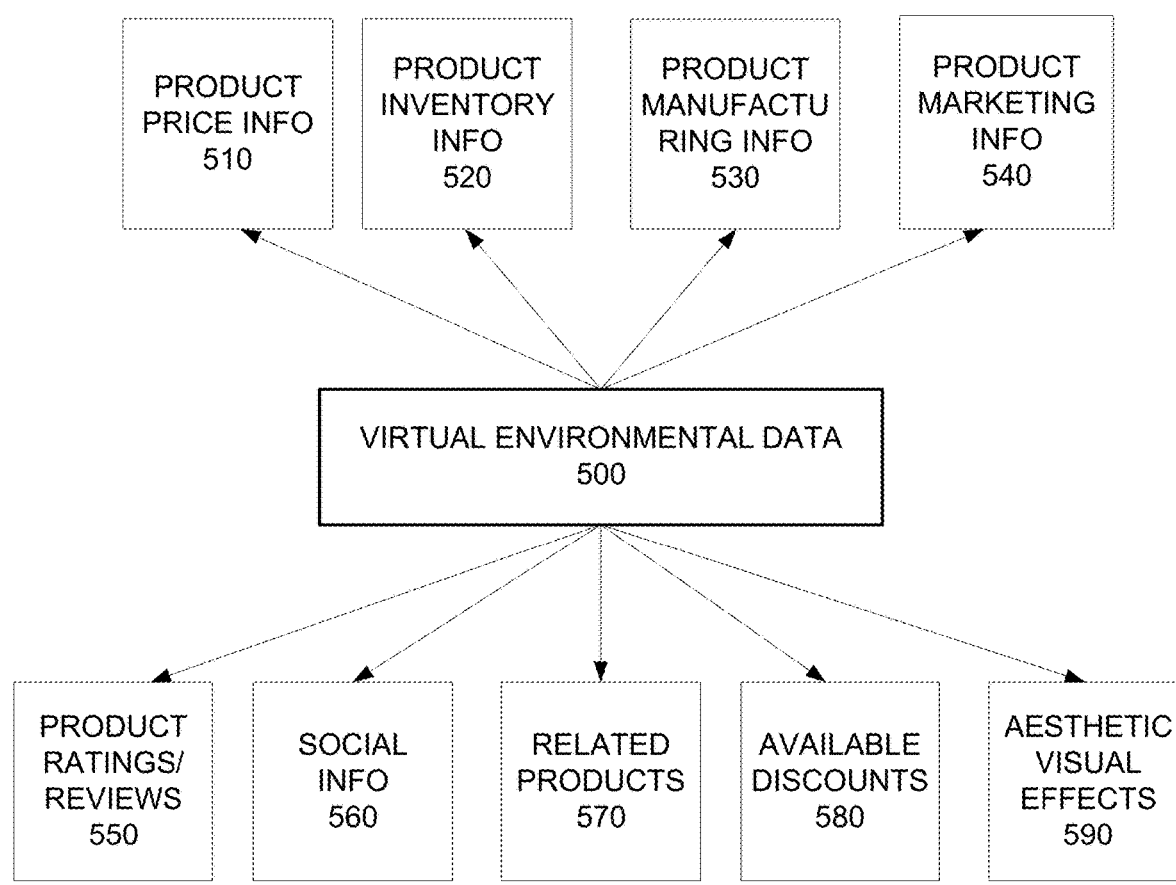
FIG. 5 is a diagram of exemplary types of virtual environmental data.

FIG. 5 shows a diagram that represents an embodiment of exemplary types of virtual environmental data 500. For example, virtual environmental data 500 may include product price information 510, product inventory information 520, product manufacturing information 530, product marketing information or description 540, product ratings or reviews 550, social information 560, related products 570, available discounts 580, and particular visual effects 590.

Figure 6:
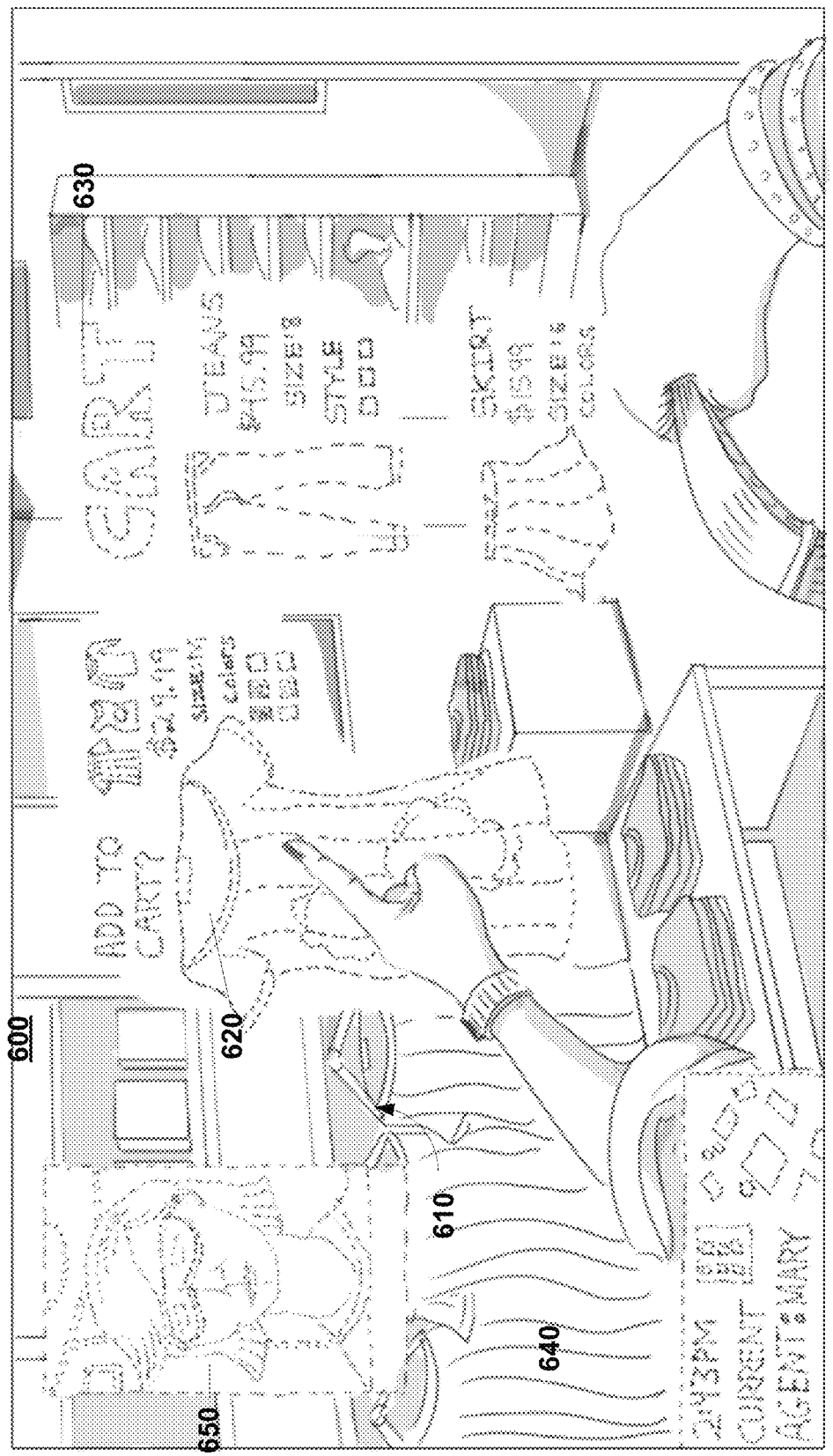
FIG. 6 is an exemplary display of an embodiment of a computing device.

FIG. 6 shows an exemplary display of an embodiment of first computing device 120. As shown, augmented environment 600, which may include, for example, currently selected item 620, shopping cart 630, status window 640, companion window 650 and the like, is overlaid on environment 610 so that a user can interact with both real and virtual elements. Currently selected item 620 may include images or 3D models of an item or items that can be manipulated to allow the item to be tried on, purchased, added to cart, returned to the shelf, or the like. Interactions with currently selected item 620 may also allow the user to toggle views, sizes, colors, styles, or other product variations/information.

Augmented environment 600 can also include shopping cart feature 630. Shopping cart 630 may display a list of items selected to be stored for later check out. Items can be added to the shopping cart 630 by the present user, the remote user, via a web interface before or during the shopping experience, or any combination of users or methods as appropriate. Augmented environment 600 can also include a status window 640 that can give information on the shopping experience, sales, location, or other characteristics useful to the user. In some embodiments, status window 640 can be movable so as to not obstruct particular items of interest.

The user of second computing device 130 may be shown in companion window 650 to allow the users to communicate and share the experience. As with other elements of augmented environment 600, companion window 650 may be movable or resizable to customize the shopping experience. In some embodiments, multiple companion windows 650 may be employed to allow additional users to share the experience. Various configurations of augmented environment 600 may be used, including unique environments for different stores, departments, and/or times of year (such as seasonal environments, environments based on a particular sale or event, or the like). Service provider terminal 110 may store individual user preferences for the configuration of augmented environment 600.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. The user may be shopping in a retail store for a variety of products. While moving through the store, the user may use an augmented reality headset device (e.g., first computing device 120) to view an augmented environment that includes virtual additions such as virtual price tags, directional graphics, product information, or lists, such as a shopping list or a shopping cart. That is, the user's wearable device or mobile device may provide environmental data to the system (e.g., to service provider terminal 110) and, in response, the system may augment the environmental data by adding virtual environmental data and provide the virtual environmental data to the user's computing device. This augmented environment may be populated by pulling in synced user profile or device data, or through visual identification of products in the real environment. A second user can join in the experience by connecting with their device (e.g., second computing device 130). That is, the system may provide the environmental data and the virtual environmental data to the second user's device to create a virtual environment. Using their device, the second user can manipulate virtual items in the augmented environment visible to both users. That is, the system may modify the virtual environment on the second user's device and the augmented environment on the first user's wearable device or mobile device to display enhanced content based on user input from the second user's device. For example, the second user can select an item on their device by tapping on a virtual price tag and placing it into a virtual shopping cart or a virtual fitting room. The first user can see this in the augmented environment via their wearable device or mobile device, and walk over to the selected item and go into an actual fitting room and try it on. While trying on the item, the second user can see how it fits and can further modify the virtual and augmented environments, for example by making a swiping gesture to select different virtual colors or virtual sizes for the item being tried on.

Another use case would be for providing virtual customer service. A shopper can enter a store, be provided with an augmented reality device, and immediately be provided a virtual personal shopper to help them select items. Alternatively, an employee at the merchant location or a third party may serve as a surrogate shopper for a user who is not present at the merchant location (e.g., to provide a shopping experience that would be otherwise unavailable or inconvenient due to location, physical handicap, or time constraint) or at another area at the merchant location (e.g., to allow a mom to continue shopping with her child in the video game area while she waits in the customer service area). Since items in the augmented environment can actually be manipulated by both users, the system provides a much more collaborative and immersive experience than basic video chat applications. It is contemplated that the interaction over system 100 can take place real-time or be delayed.

Other exemplary use cases involve interactions between users each having augmented reality devices as described in the systems and methods herein. Additionally, other exemplary use cases involve interactions between users each having virtual reality devices as described in the systems and methods herein.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:
1. A first user device comprising:
one or more processors;
a transceiver to send and receive one or more wireless communications;
a screen to display a first graphical user interface (GUI); and
memory in communication with the one or more processors, the transceiver, and the screen, the memory including instructions that, when executed, cause the one or more processors to:

transmit, to a service provider terminal via the transceiver, first environmental data comprising first visual information representing a physical environment;

receive, from the service provider terminal, virtual environmental data comprising indicator display data unrepresented in the physical environment;

display, via the first GUI, the virtual environmental data overlaying the physical environment to provide an augmented environment;

receive, from the service provider terminal and based on a first input from a second user device, modified virtual environmental data, wherein the first input corresponds to an instruction to modify the indicator display data; and display, via the first GUI, the modified virtual environmental data overlaying the physical environment to provide a modified augmented environment.

2. The first user device of claim 1, wherein the instructions further cause the one or more processors to:

transmit, to the service provider terminal via the transceiver, a request to place a virtual marker at a virtual location corresponding to a physical location in the physical environment, wherein the virtual environmental data is based on the request.

3. The first user device of claim 1, wherein the physical environment is a merchant location associated with a merchant.

4. The first user device of claim 3, wherein the instructions, when executed, further cause the one or more processors to:

transmit, to the service provider terminal via the transceiver, a purchase request to purchase a product associated with the modified augmented environment;

transmit, to a financial service provider via the transceiver, a purchase authorization request corresponding to the purchase request to purchase the product associated with the modified augmented environment; and responsive to receiving authorization from the financial service provider, transmit the purchase request to the merchant via the transceiver.

5. The first user device of claim 1, wherein the virtual environmental data includes one or more of product price information, product inventory information, product manufacturing information, product marketing information or description, product ratings or reviews, social information, related products, available discounts, and aesthetic visual effects.

6. The first user device of claim 1, comprising a mobile phone, a virtual reality headset, an augmented reality headset, a wearable device, an internet of things (IoT) device, a tablet computer, a personal computer, or combinations thereof.

7. The first user device of claim 1, wherein the first input comprises one or more of a touch, a gesture, a vocal command, or combinations thereof.

8. The first user device of claim 1, wherein the first input is associated with one or more predefined user inputs.

9. The first user device of claim 8, wherein the one or more predefined user inputs comprise a selection of a product displayed in the augmented environment.

10. The first user device of claim 8, wherein the one or more predefined user inputs comprise a modification of a product displayed in the augmented environment.

11. The first user device of claim 10, wherein the modification of the product displayed in the augmented environment comprises one or more of a color change, a size change, and a style change.

12. A first user device comprising:

one or more processors;

a transceiver to send and receive one or more of wired and wireless communications;

a screen to display a first graphical user interface (GUI), memory in communication with the one or more processors, the transceiver, and the screen, the memory including instructions that, when executed, cause the one or more processors to:

receive, from a service provider terminal via the transceiver and based on a first request from a second user device, first environmental data comprising first visual information representing a physical environment;

receive, from the service provider terminal via the transceiver and based on the first request, virtual environmental data comprising indicator display data unrepresented in the physical environment;

display, via the first GUI, the virtual environmental data overlaying the first environmental data to provide a virtual environment;

receive, via the first GUI, a first input corresponding to an instruction to modify the indicator display data;

transmit, to the service provider terminal, the first input;

receive, from the service provider terminal and based on the first input, modified virtual environmental data; and display, via the first GUI, the modified virtual environmental data overlaying the first environmental data to provide a modified virtual environment.

13. The first user device of claim 12, wherein the instructions further cause the one or more processors to:

display, via the first GUI and based on a second request from the second user device, a virtual marker at a virtual location corresponding to a physical location in the physical environment.

14. The first user device of claim 12, wherein the physical environment is a merchant location associated with a merchant.

15. The first user device of claim 14, wherein the instructions, when executed, further cause the one or more processors to:

transmit, to the service provider terminal via the transceiver, a purchase request to purchase a product associated with the modified virtual environment;

transmit, to a financial service provider via the transceiver, a purchase authorization request corresponding to the purchase request to purchase the product associated with the modified virtual environment; and responsive to receiving authorization from the financial service provider, transmit the purchase request to the merchant via the transceiver.

16. The first user device of claim 12, comprising a mobile phone, a virtual reality headset, an augmented reality headset, a wearable device, an internet of things (IoT) device, a tablet computer, a personal computer, or combinations thereof.

17. The first user device of claim 12, wherein the first input comprises one or more of a touch, a gesture, a vocal command, or combinations thereof.

18. The first user device of claim 12, wherein the first input is associated with one or more predefined user inputs comprising a modification of a product displayed in the virtual environment.

19. The first user device of claim 18, wherein the modification of the product displayed in the virtual environment comprises one or more of a color change, a size change, and a style change.

20. A first user device comprising:
one or more processors;
a transceiver to send and receive one or more of wired and wireless communications;
a screen to display a first graphical user interface (GUI), memory in communication with the one or more processors, the transceiver, and the screen, the memory including instructions that, when executed, cause the one or more processors to:
receive, from a service provider terminal via the transceiver and based on a first request from a second user device, first environmental data comprising first visual information representing a physical environment;
receive, from the service provider terminal via the transceiver and based on the first request, virtual environmental data comprising indicator display data unrepresented in the physical environment;
display, via the first GUI, the virtual environmental data overlaying the first environmental data to provide a virtual environment;
receive, via the first GUI, a first input corresponding an instruction to modify the indicator display data, wherein the first input comprises a touch, a gesture, a vocal command, or combinations thereof;
transmit, to the service provider terminal via the transceiver, the first input;
receive, from the service provider terminal via the transceiver and based on the first input, modified virtual environmental data; and
display, via the first GUI, the modified virtual environmental data overlaying the first environmental data to provide a modified virtual environment.

* * * * *